Patented Oct. 17, 1939

2,176,521

UNITED STATES PATENT OFFICE 2,176,521

AZO DYESTUFFS

Gérald Bonhôte, Basel, and Carl Apotheker, Riehen, Switzerland, assignors to the firm Society of Chemical Industry in Basle, Basel, Switzerland No Drawing. Application June 28, 1938, Serial No. 216,351. In Switzerland June 30, 1937

7 Claims. (Cl. 260—157)

This invention relates to the manufacture of new valuable azo-dyestuffs by the action of a diazo-compound on a non-sulfonated 2'-aryl-pseudonaphthazimide hydroxylated in the 2-position of the naphthalene nucleus and containing no hydroxyl group in the 2'-aryl residue. Depending on the choice of the diazo-compound, the dyestuffs produced are useful for very various purposes. When the diazo-compound used contains neither sulfonic nor carboxylic groups chiefly pigments are produced; these may advantageously be obtained on substrata, for instance textile fibres. When a sulfonated diazo-compound is used, wool or cotton dyestuffs are produced; especially valuable are the dyestuffs from ortho-hydroxylated or ortho-carboxylated diazo-compounds which lead to products capable of conversion into metalliferous dyestuffs in substance or on the fibre.

The main value of the new dyestuffs resides, however, in the unexpected property of the fundamental new hydroxylated 2'-aryl-pseudonaphthazimides of having affinity in a caustic alkaline liquor for cellulosic fibres, for instance cotton, hemp, ramie, artificial silk from regenerated cellulose or the like. If, for example, the fibre treated with the hydroxylated 2'-aryl-pseudonaphthazimide is developed with the above indicated non-sulfonated diazo-compounds, there are produced color tints which are characterized both by their intensity and by their excellent properties of fastness. Among the diazo-compounds suitable for the purpose are, for instance, those which are derived from aniline, ethers and esters of aminophenols, for instance 2:5 dichloraniline, 1-amino-2-methoxy-5-nitrobenzene, 4-chloraminodiphenyl ether, 4:4'-dichloraminodiphenyl ether; from mono-acylation products of 2:5-diaminohydroquinone diethyl ether or dimethyl ether and benzoyl chloride or phenoxyacetic acid chloride, amino-azo-dyestuffs, for instance 4-amino-5-methoxyazobenzene, 4-amino-2:5-dimethoxyazobenzene, 4:4'-diamino-2-methyl-5-methoxyazobenzene; also from chlorotoluidines, for instance 4-chloro-2-methyl-1-aminobenzene, from nitranilines, for instance 4-chloro-1-amino-2-nitro-benzene or 4-nitro-2-methoxy-1-amino-benzene, α- or β-naphthylamines or the like.

The new dyestuffs correspond therefore to the general formula

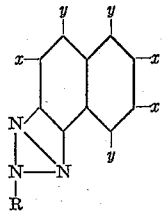

wherein R stands for an aromatic radical selected from the group consisting of aromatic radicals of the benzene and naphthalene series, two $x$'s stand for hydrogen atoms and one $x$ stands for a hydroxyl group, the two $y$'s which stand in ortho-position to hydrogen atoms standing also for hydrogen atoms and the $y$ standing in ortho-position to a hydroxy group standing for a radical —N=N—R$_1$, in which R$_1$ stands for an aromatic radical selected from the group consisting of aromatic radicals of the benzene and naphthalene series, which products are dark powders which, when produced on the vegetable fiber dye the same reddish-yellow to red, violet, blue, brown and black tints. Among these dyestuffs those are inter alia particularly valuable which correspond to the general formula

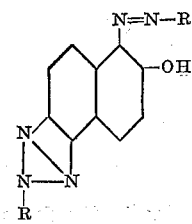

wherein R stands for an aromatic radical of the benzene series and R$_1$ stands for an aromatic radical of the benzene series which is substituted in para-position to the —N=N— group by a radical of the general formula

in which R$_2$ stands for a radical selected from the group consisting of benzoyl and phenoxy acetic radicals. This is due to the beautiful brown tints which they produce on the vegetable fiber. The dyestuffs of the general formula

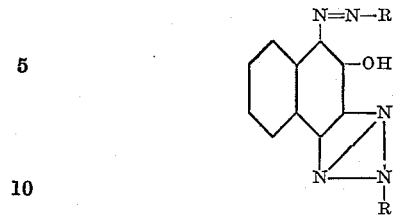

are also of particular interest on account of their clear tints.

It has also been found that the non-sulfonated 2'-arylpseudonaphahazimides hydroxylated in the 2-position of the naphthalene nucleus may be obtained in a very smooth way by subjecting to fusion with alkali a pseudo-azimidosulfonic acid obtainable by oxidizing the ortho-aminoazo-dyestuff from any diazo-compound and an aminonaphthalene-$\beta$-mono-sulfonic acid which couples in ortho-position to the amino-group with diazo-compounds.

Further data on the production of these azimides are contained in the copending application Serial No. 216,350, filed June 28, 1938.

The result of this process is quite surprising, because it was to be supposed that at the very high temperature which must be used in order to convert the mono-sulfonic acid into the hydroxyl compound there would be a deeply seated decomposition of the molecule. The same or isomeric azimides are obtained by the action of a diazo-compound on $\beta$-amino-$\beta$-hydroxynaphthalene in acid medium and treating the ortho-aminoazo-dyestuff thus produced with an oxidizing agent.

The following examples illustrate the invention the parts being by weight:

Example 1

16.2 parts of 2:5-dichloraniline are diazotized as usual and the product is introduced into a solution of 26.1 parts of 2-hydroxy-2'-phenyl-5:6-pseudonaphthazimide, 20 parts of caustic soda lye of 30 per cent strength, 15 parts of calcined sodium carbonate and 500 parts of water. The dyestuff of the formula

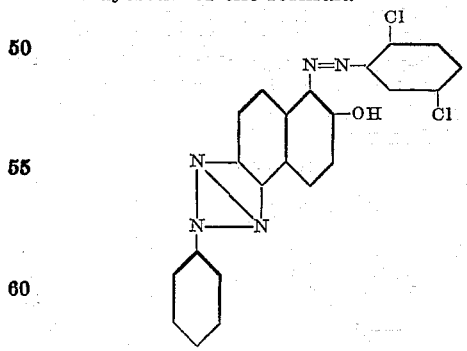

immediately separates in the form of an orange precipitate which is filtered and dried.

Example 2

Cotton yarn is impregnated with a solution of 5 grams of 2-hydroxy-2'-phenyl-5:6-pseudonaphthazimide, 7 cc. of sodium hydroxide solution of 36° Bé., 5 cc. of Turkey red oil and 15 grams of sodium chloride per litre, well wrung out, developed in a diazo-solution, buffered with sodium acetate, corresponding with 2 grams of 4-(4'-methyl)-phenoxyacetylamino-2:5-dimethoxy-1-aminobenzene per litre. There is produced a beautiful brown color of very good properties of fastness. The new dyestuff corresponds very probably to the formula

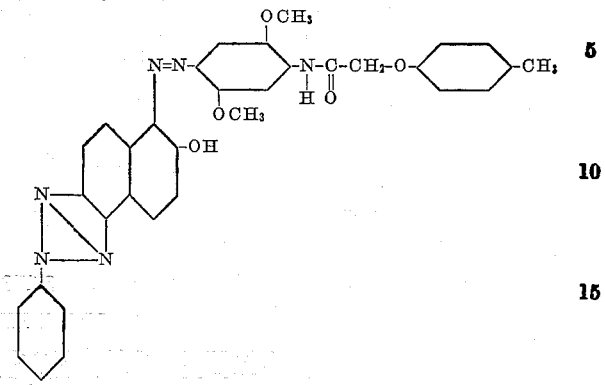

When produced on the fibre the dyestuff of Example 1 yields an orange tint. The substitution of 5-nitro-anisidine (OCH$_3$:NH$_2$:NO$_2$=1:2:5) for the 2:5-dichloroaniline leads to a redder tint, whereas diazo-$\beta$-naphthalene leads to a red tint.

Similar dyestuffs are obtained when instead of the 2-hydroxy-2'-phenyl-5:6-pseudonaphthazimide there are used other 2-hydroxy-5:6-pseudonaphthazimides arylated in 2'-position, for instance 2'-(4''-methyl)-, 2'-(4''-methoxy-), 2'-(2''-methyl)-, 2'-(2''-ethoxy)-, or 2'-(2''-methyl)-phenyl derivatives or 2'-$\alpha$-naphthyl or $\beta$-naphthyl derivatives.

Example 3

Cotton yarn is impregnated with a solution of 5 grams of 2-hydroxy-2'-(4''-chloro)-phenyl-5:6-pseudonaphthazimide, 7 cc. of caustic soda solution of 36° Bé., 5 cc. of Turkey red oil, 25 grams of sodium chloride per litre at 60° C., then well wrung out and developed in a diazo-solution buffered with sodium acetate, corresponding with 2 grams of 4-(4'-methyl)-phenoxyacetylamino-2:5-dimethoxy-1-aminobenzene per litre. There is produced a very fine brown tint of very good properties of fastness. Similar brown tints are obtained, for example, with the 1-amino-2:5-diethoxy- or -dimethoxy-4-benzoylaminobenzene or 4-(4'- or 2'-methyl)-phenoxy-acetylamino-2:5-diethoxybenzene. Such a dyestuff has for example the formula

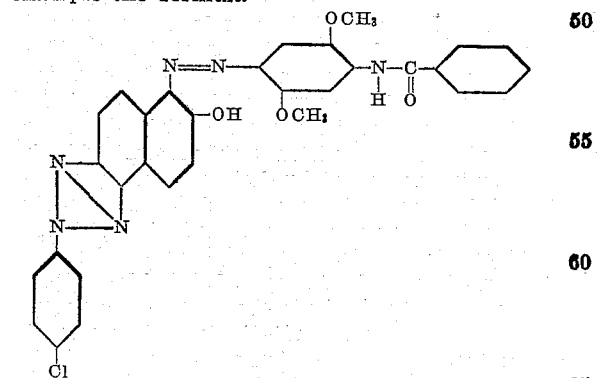

The isomeric dyestuffs which are derived from the 7:8-pseudo-naphthazimides, for example dyestuffs of the formula

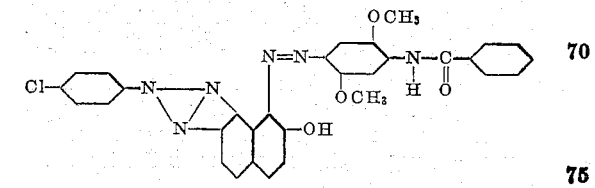

have similar tints. The same applies to the corresponding dyestuffs in which the benzoyl group of the diazotizing components is replaced by a phenoxyacetyl group.

Example 4

24.7 parts of para-chlorophenyl ester of 1-aminobenzene-2-carboxylic acid are diazotized in the usual manner and the product is introduced into a solution of 26.1 parts of 2-hyroxy-2'-phenyl-3:4-pseudonaphthazimide (cf. Example 2 of the copending application Serial No. 216,350 filed June 28, 1938), 20 parts of sodium hydroxide solution of 30 per cent strength and 15 parts of calcined sodium carbonate in 500 parts of water. The dyestuff thus formed separates immediately in the form of a yellow-orange precipitate which is filtered and dried. It corresponds to the formula

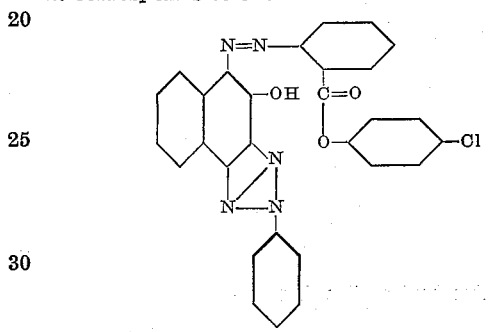

Example 5

Cotton yarn is impregnated with a solution of 6 grams of 2-hydroxy-2'-phenyl-3:4-pseudonaphthazimide, 7 cc. of caustic soda solution of 36° Bé., 5 cc. of Turkey red oil and 25 grams of sodium chloride per litre at 70° C. It is then well wrung out and developed in a diazo-solution, buffered with sodium acetate corresponding with 2 grams 2:5-dichloraniline per litre. There is produced a very pure gold orange tint of very good properties of fastness. The new dyestuff corresponds very probably to the formula

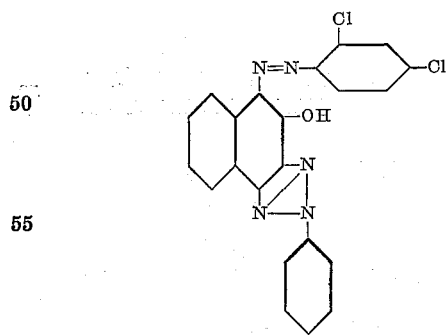

Similar tints are obtained with the diazotized 1-amino-2-methoxy-5-nitrobenzene, 4-chloro-2-amino-diphenylether, 1-amino-2-methyl-4-chlorobenzene; scarlet red tints are obtained with 1-amino-2-methoxy-5-chlorobenzene and 1-amino-2-methoxy-4-nitrobenzene; Bordeaux tints are obtained with ortho-aminoazotoluene; and violet tints with 4-(4'-methyl)-phenoxyacetylamino-2:5-dimethoxy-1-aminobenzene. With diazotized α-napthylamine there are obtained blue red tints.

2-oxy-3:4-pseudonaphthazimides further substituted in the 2'-phenyl nucleus, for instance 4''-chloro- or 4''-methoxy-substitution products, behave similarly.

Such dyestuffs are for example the products of the formulas

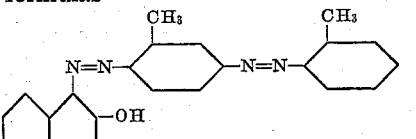

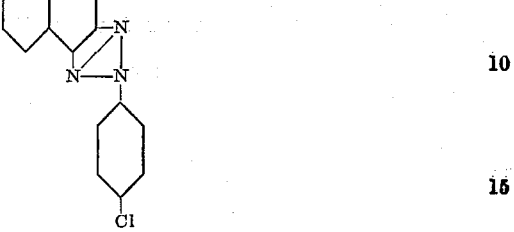

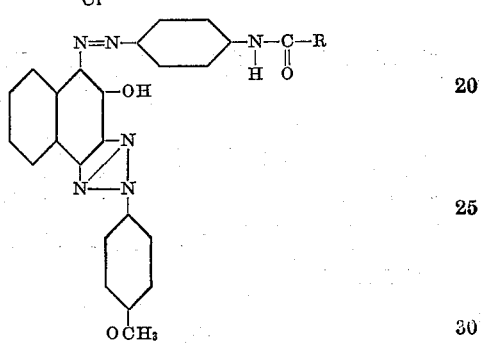

($R$=phenyl or $CH_2$-O-phenyl).

What we claim is:

1. As new dyestuffs, the products of the general formula

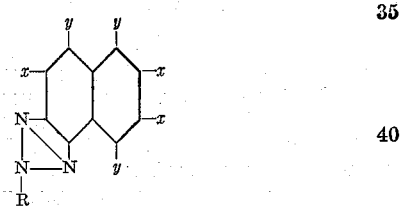

wherein R stands for an aromatic radical selected from the group consisting or aromatic radicals of the benzene and naphthalene series, two $x$'s stand for hydrogen atoms and one $x$ stands for a hydroxyl group, the two $y$'s which stand in ortho-position to hydrogen atoms standing also for hydrogen atoms and the $y$ standing in ortho-position to a hydroxyl group standing for a radical —N=N—$R_1$, in which $R_1$ stands for an aromatic radical selected from the group consisting of aromatic radicals of the benzene and naphthalene series, which products are dark powders which when produced on the vegetable fiber dye the same reddish yellow to red, violet, blue, brown and black tints of good fastness.

2. As new dyestuffs, the products of the general formula

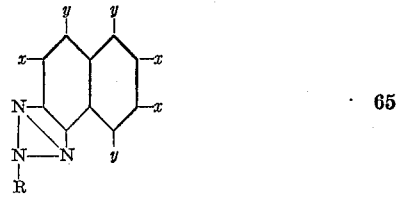

wherein R stands for an aromatic radical of the benzene series, two $x$'s stand for hydrogen atoms and one $x$ stands for a hydroxyl group, the two $y$'s which stand in ortho-position to hydrogen atoms standing also for hydrogen atoms and the $y$ standing in ortho-position to a hydroxy group standing for a radical —N=N—R₁, in which R₁ stands for an aromatic radical selected from the group consisting of aromatic radicals of the benzene and naphthalene series, which products are dark powders which, when produced on the vegetable fiber dye the same reddish yellow to red, violet, blue, brown and black tints of good fastness.

3. As new dyestuffs, the products of the general formula

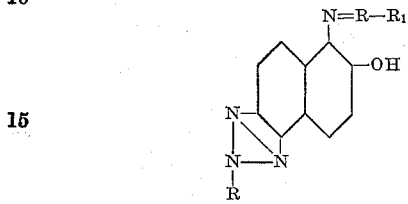

wherein R stands for an aromatic radical of the benzene series, and R₁ stands for an aromatic radical selected from the group consisting of aromatic radicals of the benzene and naphthalene series, which products are dark powders which when produced on the vegetable fiber dye the same reddish yellow to red and brown tints of good fastness.

4. As new dyestuffs, the products of the general formula

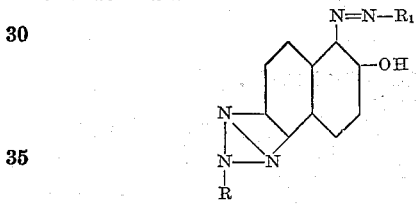

wherein R and R₁ stand for aromatic radicals of the benzene series, which products are dark powders which when produced on the vegetable fiber dye the same reddish yellow to red and brown tints of good fastness.

5. As new dyestuffs, the products of the general formula

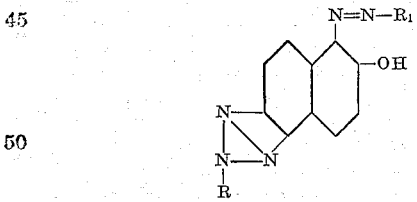

wherein R stands for an aromatic radical of the benzene series, and R₁ stands for an aromatic radical of the benzene series which is substituted in para-position to the —N=N— group by a radical of the general formula

in which R₂ stands for a radical selected from the group consisting of benzoyl and phenoxy acetyl radicals, which products are dark powders which when produced on the vegetable fiber dye the same fast brown tints of good fastness.

6. The dyestuff of the formula

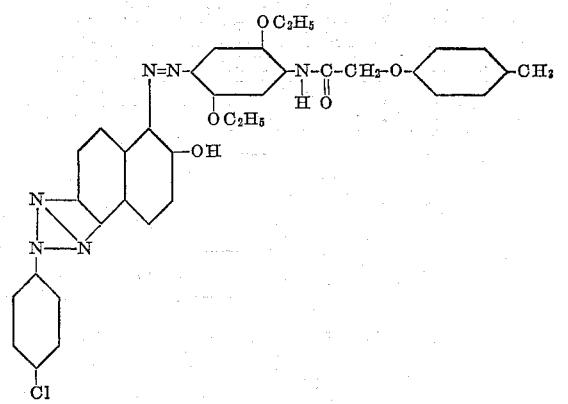

7. The dyestuff of the formula

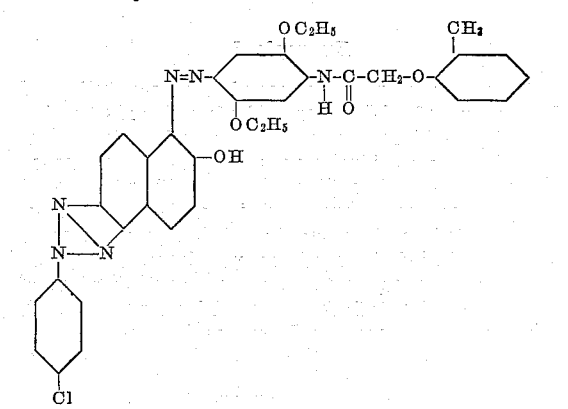

GÉRALD BONHÔTE.
CARL APOTHEKER.